Jan. 19, 1954
G. R. ERICSON
2,666,616
VALVE
Filed April 14, 1948
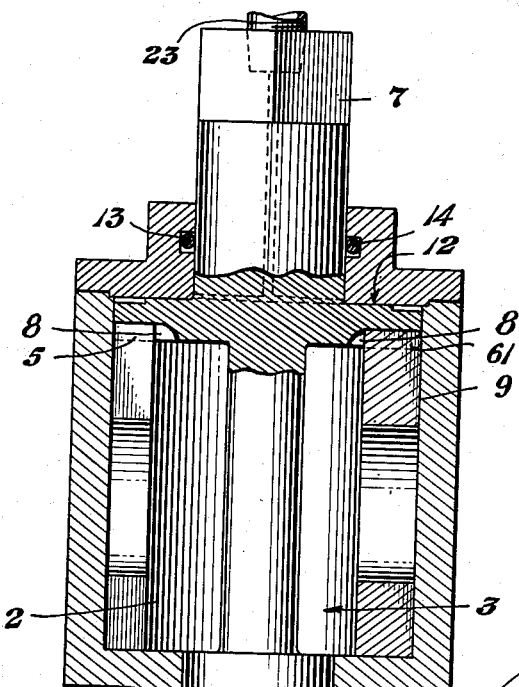
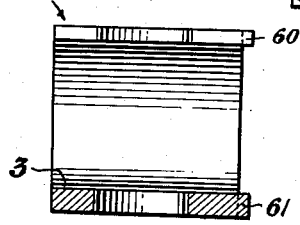
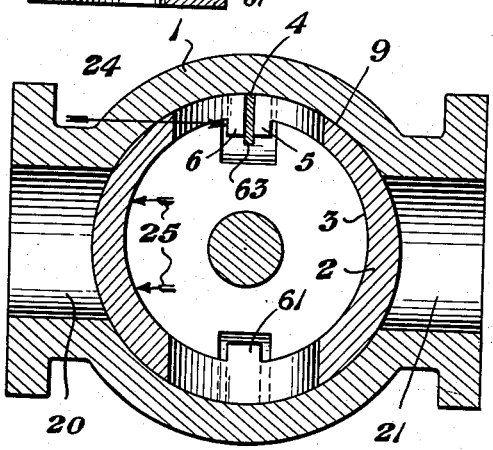
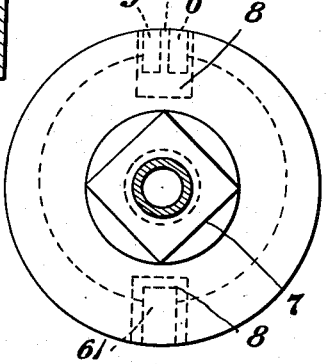
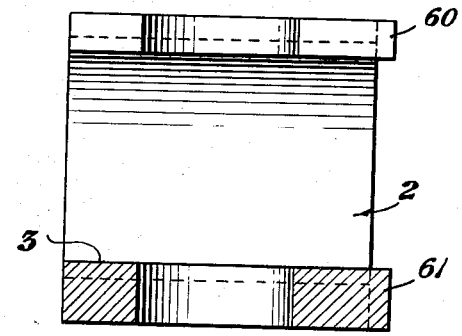
INVENTOR.
George R. Ericson
BY
George R. Ericson Patented Jan. 19, 1954

2,666,616

UNITED STATES PATENT OFFICE 2,666,616

VALVE

George R. Ericson, Kirkwood, Mo., assignor to American Car and Foundry Company, New York, N. Y., a corporation of New Jersey Application April 14, 1948, Serial No. 20,900

6 Claims. (Cl. 251—96)

This invention relates to valves and more particularly, to the cylindrical plug type of valve which may be lubricated if desired.

One of the objects of this invention is to provide an expansible plug for cylinder valves in which the expansion of the plug is due to the provision of a slot extending longitudinally of the plug body.

A further object of this invention is to provide a valve of the type in question in which the cylindrical plug is of shell form, with the inner wall of the shell eccentric to the outer wall, and in which a slot is provided longitudinally of the plug in that area of the greatest reduced thickness, so as to provide arcuate tapered wings for expansibly engaging the wall of the plug.

A further object of this invention is to provide a three-part valve in which an expansible cylindrical valve is arranged in a casing provided with a cylindrical bore, and a separable operating stem is associated with the valve and projects into the casing to operate the structure.

This invention will be better understood in reference to the accompanying specification and drawings, in which:

Fig. 1 represents a vertical cross-sectional view of the valve;

Fig. 2 is a cross-sectional view of the valve shown in Fig. 1;

Fig. 3 is a cross-sectional view of the valve member or plug;

Fig. 4 is a plan view of the stem or turning member; and

Fig. 5 is a cross-sectional view of a modified valve member or plug, similar to Fig. 3.

The valve comprises a main body member, or casing, 1, having a rotatable plug or valve member 2 which is provided with an eccentric bore 3. By locating the bore 3 eccentric with respect to the valve and the body bore, the walls of the valve will be of constantly decreasing thickness and constantly increasing resilience toward the slit to permit close engagement between the valve and body in both open and closed positions. This valve member is formed with a slit 4. The bore 3 is not necessarily a finished surface and may be left as a rough casting in which case a pair of lugs 5 and 6 may be projected inwardly all along the length of the valve member as indicated in Fig. 3.

In case the bore 3 is finished it may be desirable to remove the lugs 5 and 6 on the opposite sides of the slit 4 for the whole length of the bore and permit them to project upwardly as indicated at 60 in Fig. 5. The corresponding lug 61 will be treated accordingly in either case. The purpose of these lugs is to permit turning of the valve by a wrench or stem 7 which is provided with slots 8 to engage the sides of the lugs 5 or 6 according to which way the valve is being turned.

It will be understood that the valve formed with the longitudinal slot 4 may be originally ground with a shim 63 in the slot while in compressed condition, so that it will spring back again and expand slightly when released, so that the valve may be ground and finished to exactly the same diameter as the interior of the bore 9 of the casing member 1, and yet have a tendency to expand and snugly fit the bore of the casing. It will, of course, be understood that the shim 63 is not to be left in the slot when the valve is assembled in the body but has been shown in place only for convenience of description. This causes the valve to make a snug fit in the casing regardless of pressure of the lading which may be through the inlet and outlet openings 20 and 21. It is also to be understood that in this particular type of valve it makes no difference which opening is used for the inlet and which for the outlet as the valve will always be sealed against pressure in either case.

The stem 7 is separate and distinct from and shiftable with respect to the valve 2 and has an annular seat 12 forming a seal to prevent the escape of the lading around the stem 7.

Any desired packing such as O-ring 13 may be provided as in the groove 14 for additional sealing security.

While this valve is designed for high pressure use and is desired to turn freely, a balancing end or stem 15 constituting in effect a piston connected to the stem 7 may be placed at the lower end of the casing and surrounded by a similar O-ring or other packing 16. In order to make the valve readily convertible from a balanced valve to a fully sealed stem a relief port 17 sealed by a screw valve 18 may be provided in an extension 19 at the lower end of the valve, thus the valve 18 may be unscrewed if desired to relieve the pressure at the port 17 for balancing purposes to make the valve easy to turn and then tightened again to close port 17 and to form a complete seal as soon as the valve has been rotated to the desired position.

The valve may, if desired, be lubricated by means of a screw 23 mounted in the stem although its lubrication is not an absolute necessity as the mechanical structure of the valve itself provides for the loosening of the plug or valve whenever the stem is turned. One of the slots 8 which are formed in the lower face of the stem or turning member will contact one or the other of the members 6 or 5 before the other slot 8 contacts the member 61 when the stem is turned in either direction. As clearly shown in Figs. 2 and 4, the distance between the opposite sides of the members 6 and 5 when in operative position is just a little greater than the thickness of the member 61. In other words, the space between the walls of rib 61 and its associated groove is greater than the space between the outer walls of lugs 5 and 6 and their associated grooves. This results in the first turning pressure of the valve member 2 being placed at a single point as for instance the point indicated by the arrow 24 on lugs 6 so that if the valve 2 will stick at all the width of the slot 4 is reduced and the diameter of the plug 2 is correspondingly reduced thereby relieving the pressure between the plug and the casing and permitting free turning.

Due to the above described construction there is always a resilient metal-to-metal contact between the seating surfaces of the valve and the casing and this resilient force is increased by line pressure so as to insure a tight seal. Due to the fact that the plug 2 is hollow and also the fact that its walls at the sealing surfaces are not quite as thick as the walls of the casing at the sealing surfaces, the bending stresses of line pressure on the inside of the valve, for instance as indicated by the arrows 25, result in greater strain of the member 2 than of the valve casing 1 at a point surrounding the adjacent seat. This provides ample opportunity for the valve seat ring to conform to the surface of the seat regardless of changes in the shape and size of the seat which may occur when the valve and line are subjected to high pressure.

I claim:

1. In a valve structure, a valve casing having a vertical bore and transversely extending inlet and outlet openings, a valve plug in said casing arranged for rotative movement about its axis, said valve plug having inlet and outlet ports for registering with the inlet and outlet ports of said casing, and being formed as a tubular shell structure with the contour of the inner wall eccentric to the contour of the outer wall, and a valve stem for said plug separate from said valve plug whereby the latter may move relative to the stem, said valve stem including a radial flange adapted to normally engage the plug structure and also including vertically spaced ends of substantially equal area positioned above and below said tubular shell.

2. In a valve structure, a valve casing having a vertical bore and transversely extending inlet and outlet openings, a valve plug adapted to be arranged for movement about its axis in said bore, said valve plug being formed as a vertically split cylindrical shell, the inner wall of said shell being eccentric to the outer wall, a valve stem mounted in said casing and being separate from and shiftable relative to the split shell, said valve stem being provided with upper and lower spaced apart bearing portions of substantially equal area, O-rings sealing the upper and lower portions of said stem, and lost motion means connecting said stem and said shell whereby rotation of the stem will move said shell about its axis to cause relative movement between the ports in the shell and the ports in the casing.

3. In a valve structure, a valve casing formed with a cylindrical bore, inlet and outlet openings formed in the cylindrical wall of the casing, a valve plug adapted to be arranged in said cylindrical bore, said plug being formed of a split cylindrical shell with the contour of the inner face of the shell eccentric to the contour of the outer face of the shell, a valve stem separate from the shell, lost motion means for operably connecting said valve stem and said shell, a piston at one end of the valve stem and joined to the stem by means extending axially through said shell, said piston having an area substantially equal to the stem area and operating in a ported chamber connected to the atmosphere, and a valve for opening and closing the port of said chamber.

4. The substance of claim 3 characterized in that means are provided for forcing lubricant into the valve stem for providing lubricant under pressure to the operating parts.

5. In a valve structure, a casing formed with a cylindrical bore and radiating inlet and outlet openings, a valve plug for the casing, said valve plug comprising a vertically split cylindrical shell rotatable in said bore, the inner wall of said shell being eccentric to the outer wall and to the axis of the shell, said shell being so constructed and arranged that its thickened portion is diametrically arranged with respect to the split in said shell, whereby arcuate wings are provided for the shell of tapering thickness and sufficiently resilient to insure engagement with the wall of the bore of the casing, ports formed in said shell and extending through the thickened and split portions thereof, and means engaging the shell adjacent the edges of the split and diametrically opposite thereto for rotating said shell in said casing, an operating stem extending axially through the valve structure and operably associated with the shell, said stem being provided with O-ring packings above and below the shell.

6. In a valve structure, a valve casing formed with a cylindrical bore, radiating inlet and outlet openings formed in the cylindrical wall of the casing, an opening formed in one end of the casing, a valve plug, said valve plug comprising a split cylindrical shell, the inner wall of said shell being formed eccentric to its outer wall, with the axis of the inner wall so arranged that the shell is of greater thickness at a point diametrically opposite to the split in the shell, aligned ports formed in the shell for registering association with the inlet and outlet openings in the casing, one of said ports being arranged at the portion of greater thickness and the other in equal portions at each side of the split in said shell, a valve stem for said shell adapted to project through the opening in the end of the casing, and means for operably connecting said stem and said shell at spaced points of the shell structure immediately adjacent the edges of said split and diametrically opposite thereto, said stem including a portion extending axially through the cylindrical shell and engaging sealing means of O-ring form provided above and below the shell and the ports formed therein.

GEORGE R. ERICSON.

References Cited in the file of this patent

UNITED STATES PATENTS

| Number | Name | Date |
| --- | --- | --- |
| 619,594 | Martin | Feb. 14, 1899 |
| 857,463 | Irwin | June 18, 1907 |
| 863,136 | Bassett | Aug. 13, 1907 |
| 1,384,893 | Horine | July 19, 1921 |
| 1,953,795 | Cooper | Apr. 3, 1934 |
| 2,319,943 | Nordstrom | May 25, 1943 |
| 2,346,052 | Seamark | Apr. 4, 1944 |
| 2,401,279 | Thorndike | May 28, 1946 |
| 2,414,966 | Melichar | Jan. 28, 1947 |
| 2,420,785 | Lorraine | May 20, 1947 |

FOREIGN PATENTS

| Number | Country | Date |
| --- | --- | --- |
| 124,894 | Great Britain | of 1919 |
| 499,703 | Great Britain | of 1939 |
| 507,725 | Great Britain | of 1939 |